US011327462B2

(12) United States Patent
Nagaoka et al.

(10) Patent No.: US 11,327,462 B2
(45) Date of Patent: May 10, 2022

(54) MAINTENANCE SUPPORT SYSTEM, NUMERICAL CONTROLLER, AND CONTROL METHOD OF MAINTENANCE SUPPORT SYSTEM

(71) Applicant: Mitsubishi Electric Corporation, Tokyo (JP)

(72) Inventors: Kotaro Nagaoka, Tokyo (JP); Takao Katsuta, Tokyo (JP); Mitsumasa Sakurai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/279,097

(22) PCT Filed: Oct. 22, 2018

(86) PCT No.: PCT/JP2018/039232
§ 371 (c)(1),
(2) Date: Mar. 24, 2021

(87) PCT Pub. No.: WO2020/084671
PCT Pub. Date: Apr. 30, 2020

(65) Prior Publication Data
US 2021/0311454 A1 Oct. 7, 2021

(51) Int. Cl.
*G05B 19/4063* (2006.01)
*G05B 23/02* (2006.01)

(52) U.S. Cl.
CPC ..... *G05B 19/4063* (2013.01); *G05B 23/0283* (2013.01)

(58) Field of Classification Search
CPC .......... G05B 19/4063; G05B 23/0283
See application file for complete search history.

(56) References Cited

U.S. PATENT DOCUMENTS

2004/0083010 A1   4/2004   Nagata et al.
2004/0186687 A1   9/2004   Ogura et al.
(Continued)

FOREIGN PATENT DOCUMENTS

CN   1462328 A      12/2003
JP   2002-123307 A   4/2002
(Continued)

OTHER PUBLICATIONS

International Search Report and Written Opinion dated Dec. 25, 2018, received for PCT Application PCT/JP2018/039232, Filed on Oct. 22, 2018, 9 pages including English Translation.
(Continued)

*Primary Examiner* — Christopher E. Everett
(74) *Attorney, Agent, or Firm* — Xsensus LLP

(57) ABSTRACT

A maintenance support system includes a numerical controller that controls the drive of an operating mechanism of an industrial machine and a server that is a support device capable of communicating with the numerical controller, and the maintenance support system supports maintenance of the industrial machine. The numerical controller includes a first information generating unit that acquires, from among data related to a state of operation of the operating mechanism, data related to the state of operation of the operating mechanism when an anomaly is found in an operation of the operating mechanism, and generates first information including the data acquired. The server includes a second information generating unit that generates second information to be proposed to the numerical controller for the maintenance on the basis of the content of the first information.

17 Claims, 10 Drawing Sheets

(56) References Cited

U.S. PATENT DOCUMENTS

| | | |
|---|---|---|
| 2008/0091383 A1 | 4/2008 | Ueno |
| 2010/0206039 A1* | 8/2010 | Kates .................... G08B 29/26 |
| | | 73/1.01 |
| 2012/0283851 A1 | 11/2012 | Yamamoto |

FOREIGN PATENT DOCUMENTS

| | | |
|---|---|---|
| JP | 2002-287816 A | 10/2002 |
| JP | 2006-146915 A | 6/2006 |
| JP | 2008-97363 A | 4/2008 |
| JP | 2011-134169 A | 7/2011 |

OTHER PUBLICATIONS

Notification of Reasons for Refusa dated May 21, 2019, received for JP Application 2019-517453, 8 pages including English Translation.
Decision to Grant dated Oct. 15, 2019, received for JP Application 2019-517453, 5 pages including English Translation.
Office Action dated Oct. 27, 2021, in corresponding Chinese patent Application No. 201880098789.5, with a partial English machine translation, 8 pages.

* cited by examiner

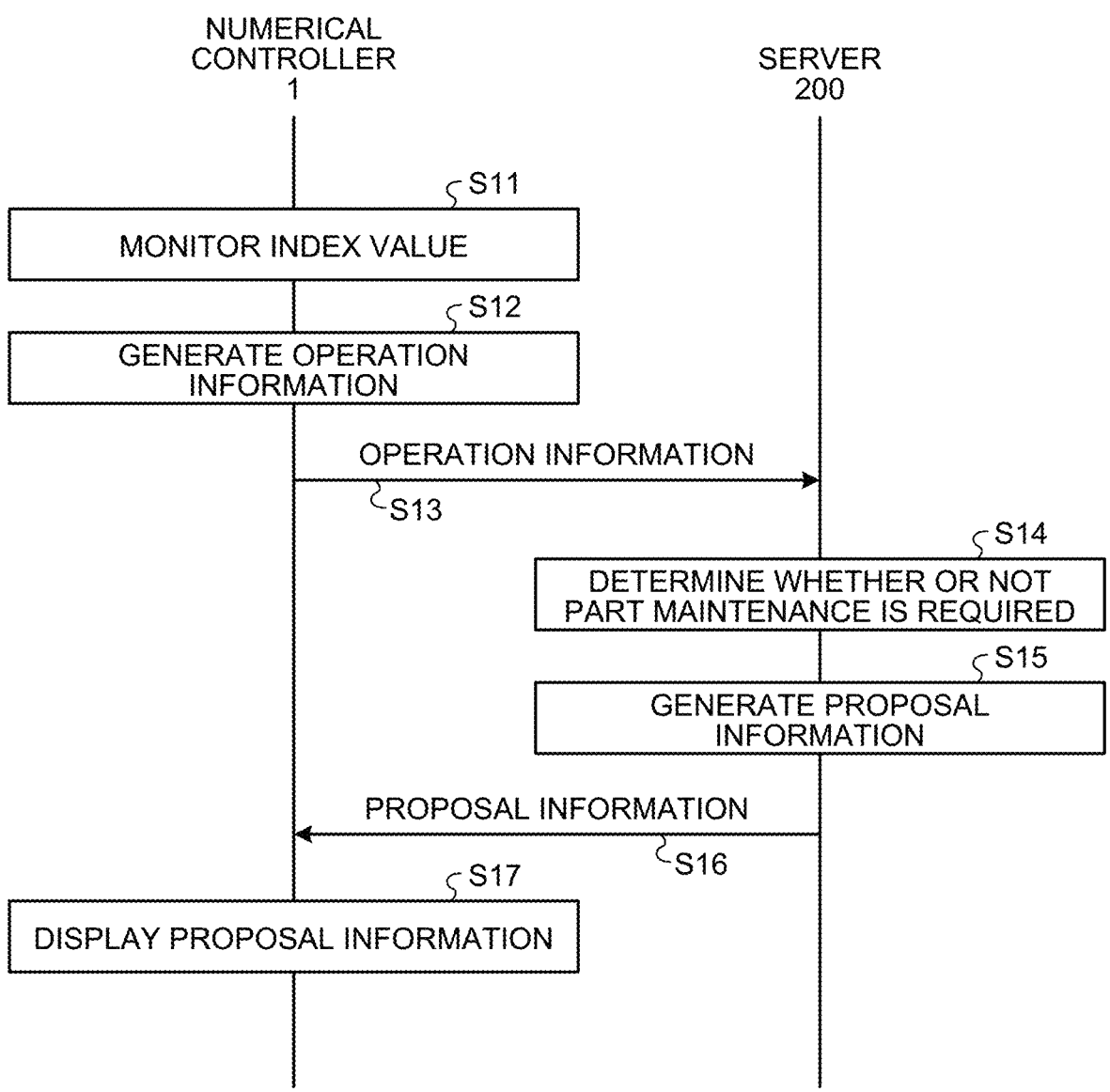

MAINTENANCE SUPPORT SYSTEM, NUMERICAL CONTROLLER, AND CONTROL METHOD OF MAINTENANCE SUPPORT SYSTEM

CROSS-REFERENCE TO RELATED APPLICATION

The present application is based on PCT filing PCT/JP2018/039232, filed Oct. 22, 2018, the entire contents of which are incorporated herein by reference.

FIELD

The present invention relates to a maintenance support system that supports maintenance of an industrial machine, a numerical controller, and a control method of the maintenance support system.

BACKGROUND

Machine tools being industrial machines are required to perform stable operation over a long period of time as production goods. A control system of the machine tool controls an operating mechanism of the machine tool by numerical control that causes a relative position between a tool and a workpiece to follow a command path specified in a machining program. As for the operating mechanism, aging of parts making up the operating mechanism may cause an increase in a response error, which is an error between the command path and an actual path, and a decrease in the operating accuracy. The decrease in the operating accuracy of the operating mechanism decreases the machining accuracy of the machine tool. When the decrease in the machining accuracy is recognized, the machine tool is subjected to maintenance work such as readjustment of control parameters, which are parameters for controlling the operating mechanism, or replacement of the parts of the operating mechanism. The operation of the machine tool is to be stopped until the maintenance work is completed so that, in terms of productivity, it is desired that the maintenance work be performed promptly after the decrease in the machining accuracy is recognized.

Patent Literature 1 discloses a system in which a robot, which is an industrial machine installed at a production site, and an analysis computer of a manufacturer at a remote location from the robot are connected to be able to communicate with each other via a network, and the analysis computer performs an analysis for maintenance of the robot. The system of Patent Literature 1 transmits data of various state quantities of a control system from the production site to the analysis computer, and adjusts control parameters using the analysis computer. The analysis computer transmits the control parameters after the adjustment to a computer that controls the robot at the production site. A remote maintenance system of Patent Literature 1 can handle the maintenance of the robot faster than a case where a worker performing the maintenance work is dispatched from the manufacturer to the production site.

CITATION LIST

Patent Literature

Patent Literature 1: Japanese Patent Application Laid-open No. 2002-287816

SUMMARY

Technical Problem

In the prior art of Patent Literature 1 above, the data of the state quantities during the entire period in which the robot operates is transferred from the production site to the analysis computer of the manufacturer. Thus, in the system according to the prior art, the data traffic may be increased because the data of the state quantities during the entire period is transferred, and the communication speed may be decreased. Also, in the system according to the prior art, when the data of the state quantities is simply narrowed down and transferred in order to reduce the data traffic, it may be difficult to accurately grasp a state of operation as the data necessary for accurately grasping the state of operation may not be transferred.

The present invention has been made in view of the above, and an object of the present invention is to provide a maintenance support system capable of accurately grasping a state of operation by an operating mechanism of an industrial machine and reducing data traffic.

Solution to Problem

In order to solve the above problem and achieve the object, a maintenance support system according to the present invention includes a numerical controller that controls the drive of an operating mechanism of an industrial machine, and a support device that can communicate with the numerical controller, the maintenance support system supporting maintenance of the industrial machine. The numerical controller includes a first information generating unit that acquires, from among data related to a state of operation of the operating mechanism, data related to the state of operation of the operating mechanism when an anomaly is found in an operation of the operating mechanism, and that generates first information including the data acquired. The support device includes a second information generating unit that generates second information to be proposed to the numerical controller for the maintenance on the basis of the content of the first information.

Advantageous Effects of Invention

The maintenance support system according to the present invention has an effect of being able to accurately grasp the state of operation by the operating mechanism of the industrial machine and reduce the data traffic.

BRIEF DESCRIPTION OF DRAWINGS

FIG. 16 is a chart for explaining a control method of the maintenance support system according to the second embodiment.

DESCRIPTION OF EMBODIMENTS

A maintenance support system, a numerical controller, and a control method of the maintenance support system according to embodiments of the present invention will now be described in detail with reference to the drawings. Note that the present invention is not limited to the embodiments.

First Embodiment

Figure 1:
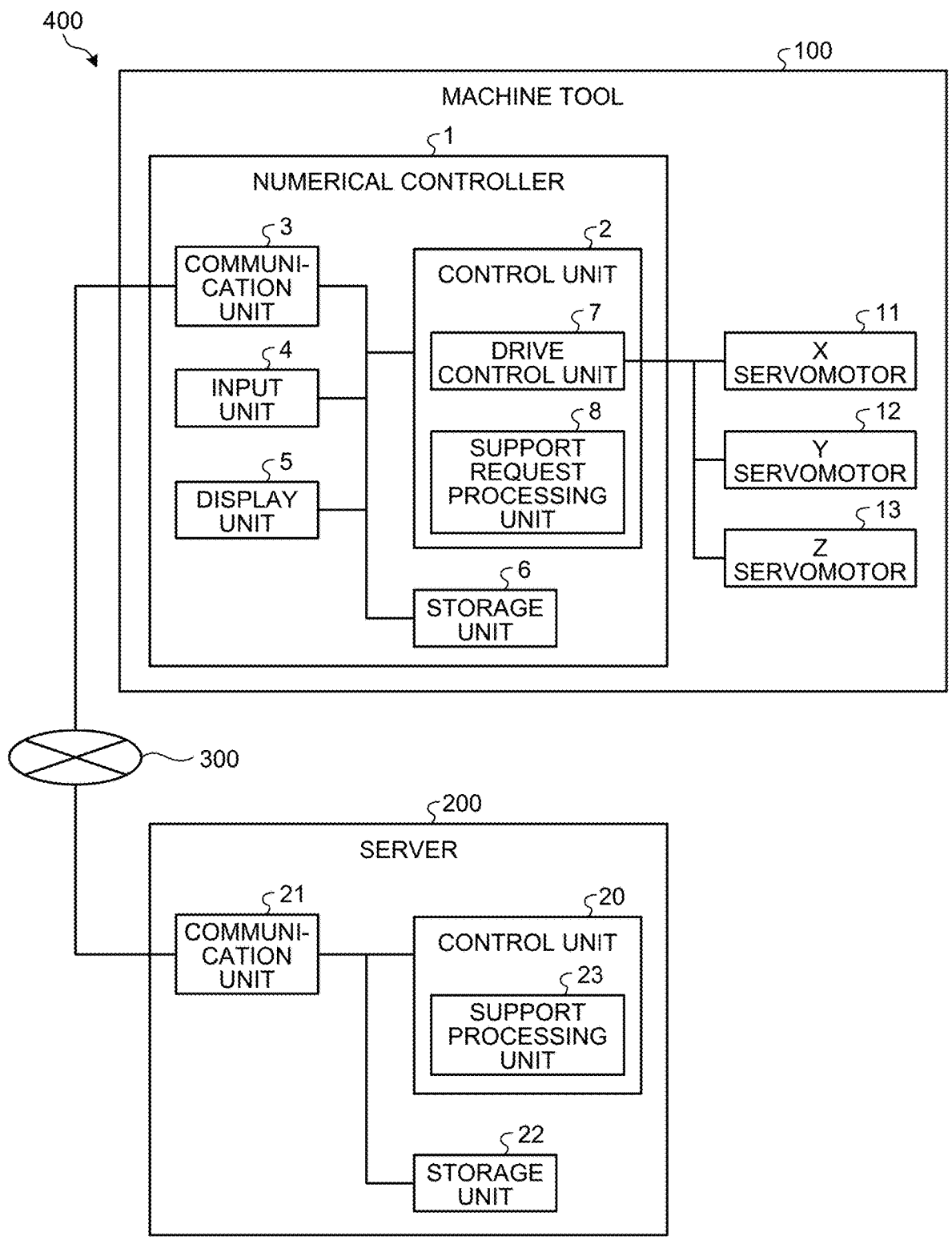
FIG. 1 is a diagram illustrating a configuration of a maintenance support system according to a first embodiment of the present invention.

FIG. 1 is a diagram illustrating a configuration of a maintenance support system 400 according to a first embodiment of the present invention. In the first embodiment, the maintenance support system 400 supports the maintenance of a machine tool 100 that is an industrial machine. The maintenance support system 400 may support the maintenance of an industrial machine other than the machine tool 100 such as an industrial robot installed at a production site.

The maintenance support system 400 includes the machine tool 100 including a numerical controller 1, and a server 200 that is a support device capable of communicating with the numerical controller 1. The numerical controller 1 controls the drive of an operating mechanism of the machine tool 100. The maintenance support system 400 supports the maintenance of the machine tool 100 by sending proposal information, which is information proposed for supporting the maintenance of the machine tool 100, from the server 200 to the numerical controller 1. Note that besides being the device integrated with the machine tool 100, the numerical controller 1 may be a device external to the machine tool 100 and connected to the machine tool 100.

In this case, the maintenance support system 400 may include the numerical controller 1 and the server 200.

The machine tool 100 includes the numerical controller 1 that is a component of a control system of the machine tool 100. The machine tool 100 further includes an X servomotor 11, a Y servomotor 12, and a Z servomotor 13 that are included in the operating mechanism. Details of the operating mechanism will be described later.

FIG. 1 illustrates a functional configuration included in the numerical controller 1. The numerical controller 1 includes a control unit 2 that controls the entire numerical controller 1, a communication unit 3 that communicates with a device external to the numerical controller 1, an input unit 4 that inputs information, a display unit 5 that displays information, and a storage unit 6 that stores information. The control unit 2 includes a drive control unit 7 that controls the drive of the operating mechanism, and a support request processing unit 8 that performs processing of requesting support for the maintenance of the machine tool 100.

FIG. 1 illustrates a functional configuration included in the server 200. The server 200 includes a control unit 20 that controls the entire server 200, a communication unit 21 that communicates with a device external to the server 200, and a storage unit 22 that stores information. The control unit 20 includes a support processing unit 23 that performs processing for supporting the maintenance of the machine tool 100. The server 200 is installed at a site of a maintenance vendor that performs maintenance work on the machine tool 100. The maintenance vendor is, for example, a manufacturer manufacturing the machine tool 100 or a vendor entrusted with the maintenance work by the manufacturer.

The communication unit 3 of the numerical controller 1 and the communication unit 21 of the server 200 are connected to be able to communicate with each other via a network 300. The network 300 is a communication network such as the Internet, a local area network (LAN), or a virtual private network (VPN).

Figure 2:
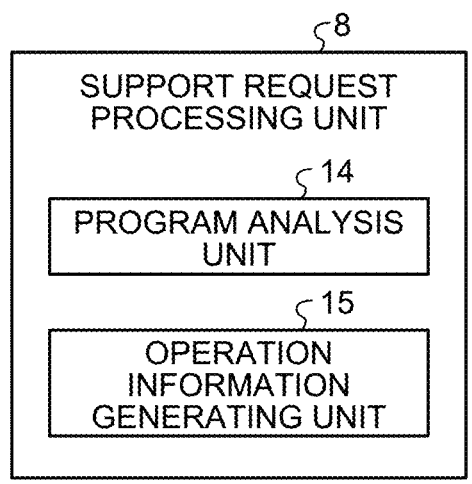
FIG. 2 is a diagram illustrating a functional configuration of a support request processing unit included in a numerical controller of the maintenance support system illustrated in FIG. 1.

FIG. 2 is a diagram illustrating a functional configuration of the support request processing unit 8 included in the numerical controller 1 of the maintenance support system 400 illustrated in FIG. 1. The support request processing unit 8 includes a program analysis unit 14 that analyzes a program specified by input of a program number to the input unit 4. The support request processing unit 8 further includes an operation information generating unit 15 that is a first information generating unit. The operation information generating unit 15 acquires data related to a state of operation of the operating mechanism when an anomaly is found in the operation of the operating mechanism. The operation information generating unit 15 generates operation information that is first information containing the data acquired. Details of the program analysis unit 14 and the operation information generating unit 15 will be described later.

Figure 3:
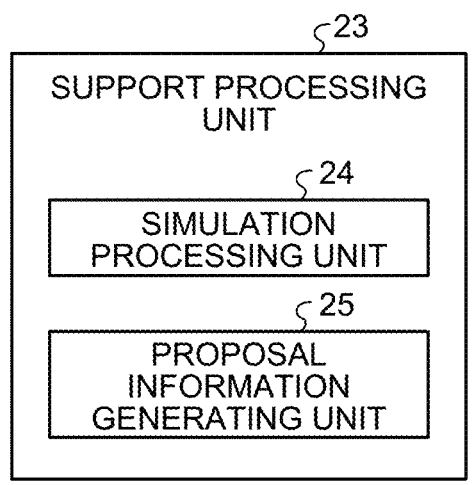
FIG. 3 is a diagram illustrating a functional configuration of a support processing unit included in a server of the maintenance support system illustrated in FIG. 1.

FIG. 3 is a diagram illustrating a functional configuration of the support processing unit 23 included in the server 200 of the maintenance support system 400 illustrated in FIG. 1. The support processing unit 23 includes a simulation processing unit 24 that simulates a state of operation of the operating mechanism by simulating the control of the operating mechanism and simulating the operation of the operating mechanism. The support processing unit 23 further includes a proposal information generating unit 25 that is a second information generating unit. The proposal information generating unit 25 generates proposal information, which is second information proposed to the numerical controller 1 for the maintenance of the machine tool 100, on the basis of the operation information. Details of the simulation processing unit 24 and the proposal information generating unit 25 will be described later.

Each functional unit of the numerical controller 1 illustrated in FIG. 1 is implemented when a control program for executing a control method of the maintenance support system 400 of the first embodiment is executed by using hardware.

Figure 4:
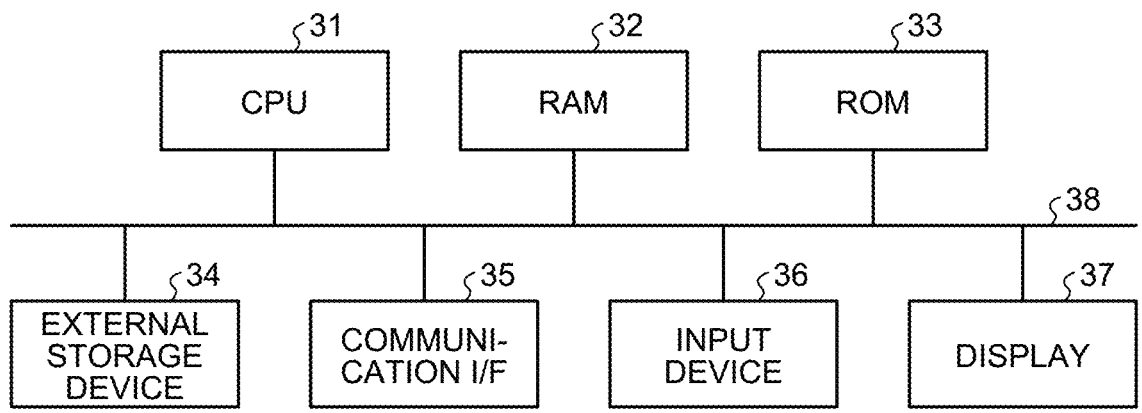
FIG. 4 is a block diagram illustrating a hardware configuration of the numerical controller according to the first embodiment.

FIG. 4 is a block diagram illustrating a hardware configuration of the numerical controller 1 according to the first embodiment. The numerical controller 1 includes a central processing unit (CPU) 31 that executes various processings, a random access memory (RAM) 32 that includes a data storage area, a read only memory (ROM) 33 that is a non-volatile memory, and an external storage device 34 that stores the control program and various information. The numerical controller 1 further includes a communication interface (I/F) 35 that is a connection interface with a device external to the numerical controller 1, an input device 36 that inputs information, and a display 37 that is an output device for displaying information on a screen. The parts of the numerical controller 1 illustrated in FIG. 4 are connected to one another via a bus 38.

The CPU 31 executes a program stored in the ROM 33 and the external storage device 34. The functions of the control unit 2 illustrated in FIG. 1 are implemented using the CPU 31. The external storage device 34 is a hard disk drive (HDD) or a solid state drive (SSD). The function of the storage unit 6 illustrated in FIG. 1 is implemented using the external storage device 34. The ROM 33 stores software or a program for controlling hardware that is a boot loader such as Basic Input/Output System (BIOS) or Unified Extensible Firmware Interface (UEFI) being a program for basic control of a computer or controller that is the numerical controller 1. Note that the control program may be stored in the ROM 33.

The various programs stored in the ROM 33 and the external storage device 34 are loaded into the RAM 32. The CPU 31 executes various processings by expanding the control program in the RAM 32. The input device 36 includes a keyboard and a pointing device. The function of the input unit 4 illustrated in FIG. 1 is implemented using the input device 36. One example of the display 37 is a liquid crystal display including a liquid crystal panel. The function of the display unit 5 illustrated in FIG. 1 is implemented using the display 37. The function of the communication unit 3 illustrated in FIG. 1 is implemented using the communication I/F 35.

The server 200 illustrated in FIG. 1 is a computer on which the control program for executing the control method of the maintenance support system 400 of the first embodiment is installed. Each functional unit of the server 200 is also implemented by executing the control program using hardware.

Figure 5:
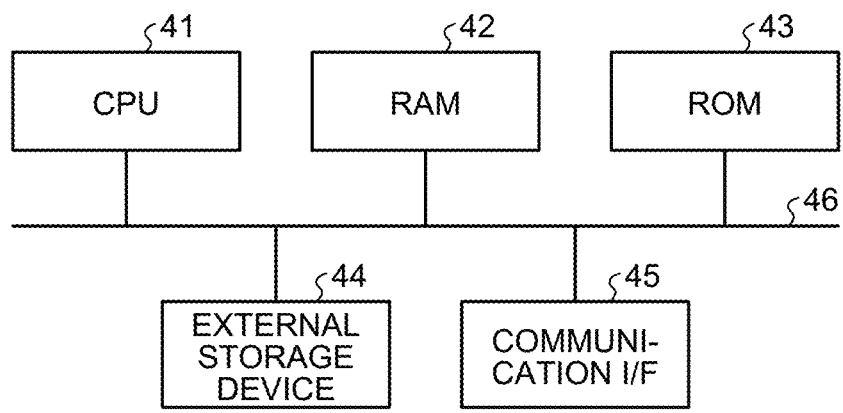
FIG. 5 is a block diagram illustrating a hardware configuration of the server according to the first embodiment.

FIG. 5 is a block diagram illustrating a hardware configuration of the server 200 according to the first embodiment. The server 200 includes a CPU 41 that executes various processings, a RAM 42 that includes a data storage area, a ROM 43 that is a non-volatile memory, an external storage device 44 that stores a control program and various information, and a communication I/F 45 that is a connection interface with a device external to the server 200. The parts of the server 200 illustrated in FIG. 5 are connected to one another via a bus 46.

The function of the control unit 20 illustrated in FIG. 1 is implemented using the CPU 41. The function of the storage unit 22 illustrated in FIG. 1 is implemented using the external storage device 44. The function of the communication unit 21 illustrated in FIG. 1 is implemented using the communication I/F 45. The description of the parts illustrated in FIG. 5 redundant to that of the parts illustrated in FIG. 4 will be omitted.

The control program may be stored in a storage medium that can be read by a computer. The external storage device 34 or 44 may store the control program stored in the storage medium. The storage medium may be a portable storage medium being a flexible disk, or may be a flash memory being a semiconductor memory. The control program may be installed on the numerical controller 1 and the server 200 from another computer or server device via a communication network.

Figure 6:
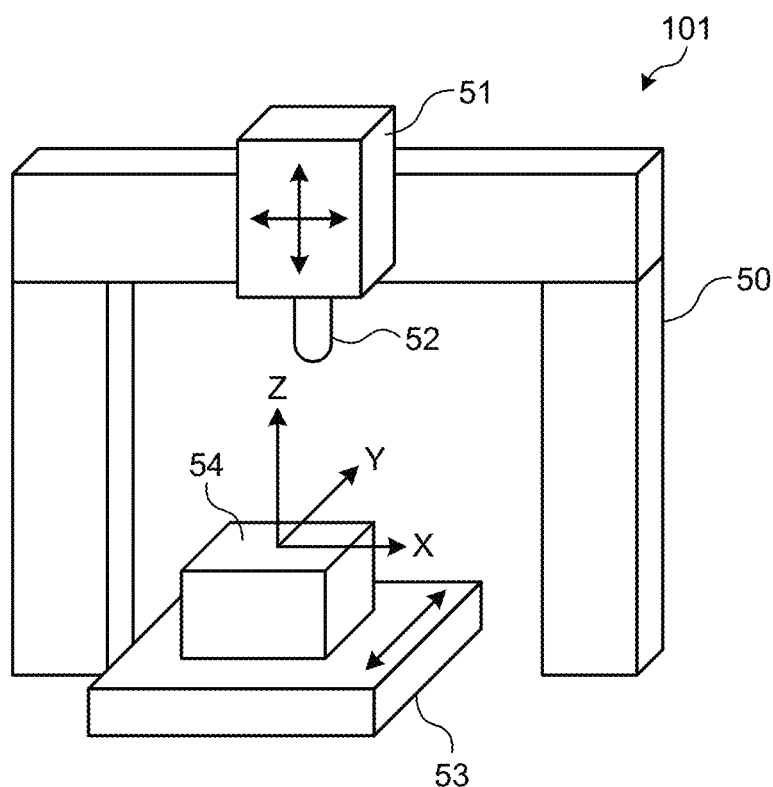
FIG. 6 is a diagram illustrating a schematic configuration of an operating mechanism included in a machine tool of the maintenance support system illustrated in FIG. 1.

FIG. 6 is a diagram illustrating a schematic configuration of an operating mechanism 101 included in the machine tool 100 of the maintenance support system 400 illustrated in FIG. 1. The machine tool 100 is a three-axis control machine tool that includes the operating mechanism 101 capable of translational movement along an X-axis, a Y-axis, and a Z-axis being the three axes. The machine tool 100 may be one that performs five-axis control machining which enables rotation in each of two axes in addition to the translational movement in the three axes.

The operating mechanism 101 includes a spindle head 51 provided on a column 50 and a stage 53 on which a workpiece 54 is placed. A tool 52 for machining the workpiece 54 is attached to the spindle head 51. The drive control unit 7 illustrated in FIG. 1 controls a relative position between the tool 52 and the workpiece 54 in a three-dimensional space. The machine tool 100 cuts the workpiece 54 by bringing the tool 52 into contact with the workpiece 54 while rotating the tool 52 around the Z-axis. The spindle head 51 is provided with a spindle motor for rotating the tool 52. FIG. 6 omits the illustration of the spindle motor.

The spindle head 51 can move in an X-axis direction and a Z-axis direction. The stage 53 can move in a Y-axis direction. The operating mechanism 101 includes a mechanism that converts rotary motion of the X servomotor 11 illustrated in FIG. 1 into linear motion, a mechanism that converts rotary motion of the Y servomotor 12 illustrated in FIG. 1 into linear motion, and a mechanism that converts rotary motion of the Z servomotor 13 illustrated in FIG. 1 into linear motion. The mechanism that converts rotary motion into linear motion includes a motion transfer element such as a ball screw. The X servomotor 11 drives the spindle head 51 in the X-axis direction. The Y servomotor 12 drives the stage 53 in the Y-axis direction. The Z servomotor 13 drives the spindle head 51 in the Z-axis direction. The operating mechanism 101 changes the relative position between the tool 52 and the workpiece 54 by moving the spindle head 51 in the X-axis direction and the Z-axis direction and moving the stage 53 in the Y-axis direction. Note that the direction in which the spindle head 51 can move and the direction in which the stage 53 can move are not limited to those described above, and may be changed as appropriate among the directions of the three axes.

Figure 7:
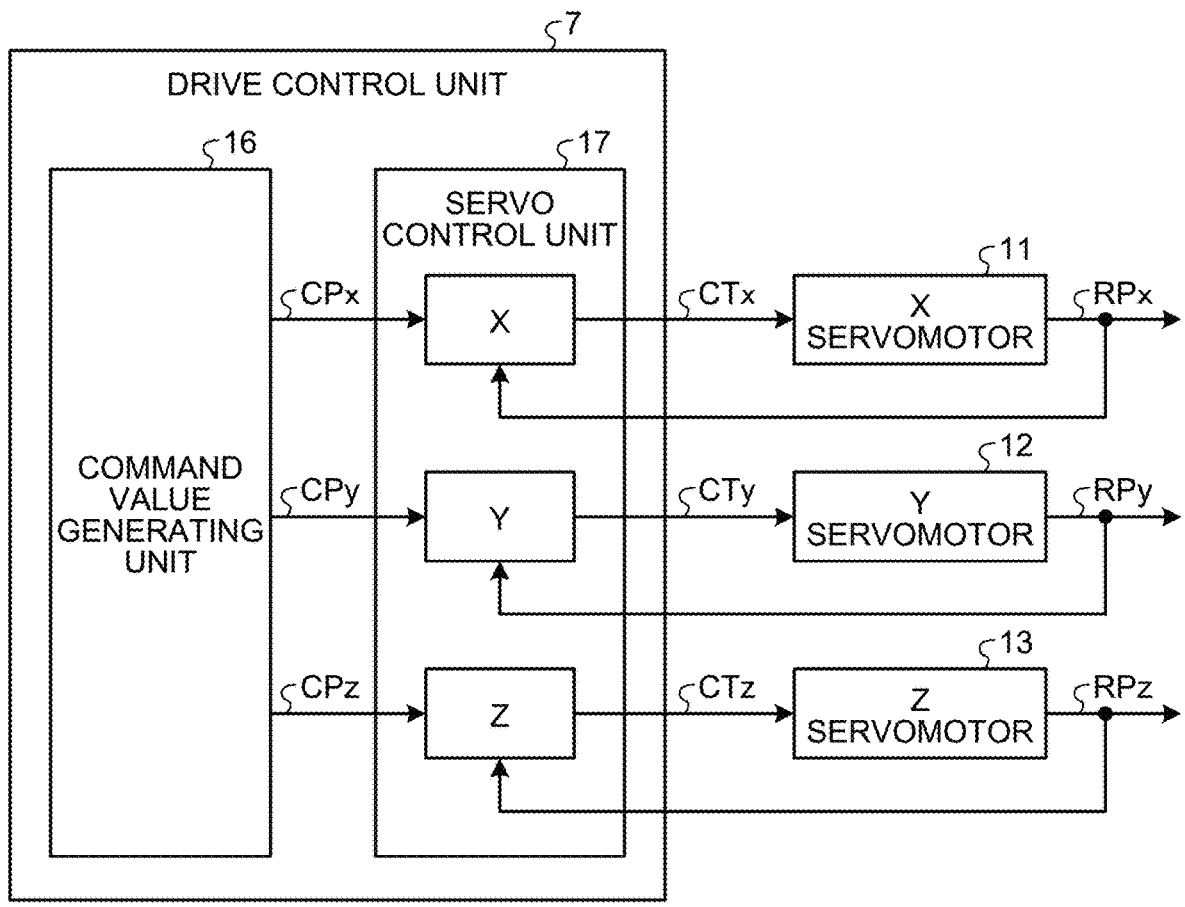
FIG. 7 is a diagram illustrating a drive control unit included in the numerical controller illustrated in FIG. 1 and servomotors included in the operating mechanism.

FIG. 7 is a diagram illustrating the drive control unit 7 included in the numerical controller 1 illustrated in FIG. 1 and the servomotors included in the operating mechanism. In the following description, the relative position of the tool 52 with respect to the workpiece 54 may be simply referred to as a "position".

The drive control unit 7 includes a command value generating unit 16 that generates a command position CPx in the X-axis direction, a command position CPy in the Y-axis direction, and a command position CPz in the Z-axis direction. The command value generating unit 16 interprets a machining program being a program for the numerical control of the operating mechanism 101, and generates the command positions CPx, Cpy, and CPz according to the machining program. The command positions CPx, Cpy, and CPz represent target positions for movement.

The drive control unit 7 includes a servo control unit 17 that generates command torques CTx, CTy, and CTz. The command torque CTx is a command for controlling the torque generated in the X servomotor 11. The command torque CTy is a command for controlling the torque generated in the Y servomotor 12. The command torque CTz is a command for controlling the torque generated in the Z servomotor 13. A response position RPx represents a position reached by the control of the X servomotor 11 according to the command torque CTx. A response position RPy represents a position reached by the control of the Y servomotor 12 according to the command torque CTy. A response position RPz represents a position reached by the control of the Z servomotor 13 according to the command torque CTz.

A position sensor that detects the response position PRx is attached to the X servomotor 11. A position sensor that detects the response position PRy is attached to the Y servomotor 12. A position sensor that detects the response position PRz is attached to the Z servomotor 13. FIG. 7 omits the illustration of the position sensors. The drive control unit 7 receives results of the detection of the response positions PRx, RPy, and RPz. The drive control unit 7 performs feedback control of the command torque CTx by an operation for adjusting the command torque CTx such that the response position RPx follows the command position CPx. The drive control unit 7 performs feedback control of the command torque CTy by an operation for adjusting the command torque CTy such that the response position RPy follows the command position CPy. The drive control unit 7 performs feedback control of the command torque CTz by an operation for adjusting the command torque CTz such that the response position RPz follows the command position CPz.

Figure 8:
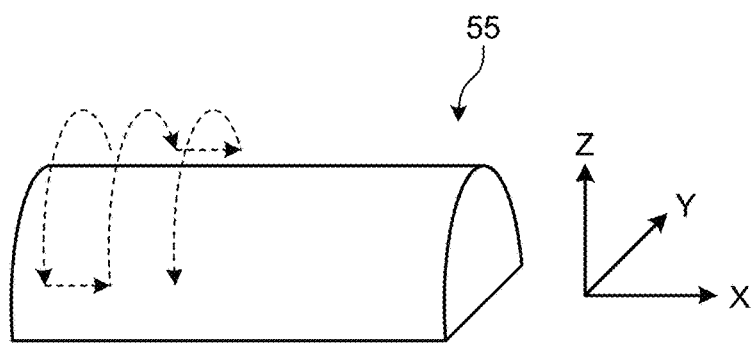
FIG. 8 is a diagram illustrating a first example of a machined shape obtained by machining with the machine tool illustrated in FIG. 1.

FIG. 8 is a diagram illustrating a first example of a machined shape obtained by machining with the machine tool 100 illustrated in FIG. 1. A workpiece 55 illustrated in FIG. 8 has a semi-cylindrical shape. The workpiece 55 is disposed such that its longitudinal direction coincides with the X-axis direction. In machining a curved surface of the workpiece 55, the machine tool 100 repeats causing the tool 52 to move along an arc in a YZ plane and causing the position of the tool 52 to be shifted in the X-axis direction after each movement along the arc. Dashed arrows illustrated in FIG. 8 represent a path of the tool 52.

Figure 9:
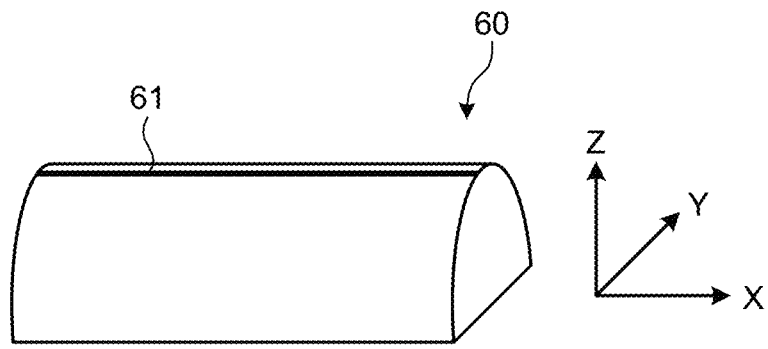
FIG. 9 is a diagram illustrating a second example of a machined shape obtained by machining with the machine tool illustrated in FIG. 1.

FIG. 9 is a diagram illustrating a second example of a machined shape obtained by machining with the machine tool 100 illustrated in FIG. 1. A workpiece 60 illustrated in FIG. 9 is machined by the same machining program as that in the case of the workpiece 55 illustrated in FIG. 8. The workpiece 60 has a linear streak 61 that is not found in the workpiece 55. When the direction in which the tool 52 moves in the Z-axis direction is reversed, the direction of friction between elements of the operating mechanism 101 driven by the Z servomotor 13 is reversed. The reversal of the direction of friction can be a disturbance as an external action that disturbs the control of the Z servomotor 13. The influence of such a disturbance may result in a following error in the command torque CTz generated by the servo control unit 17. Due to such a following error, the top of the curved surface of the workpiece 60 in the Z-axis direction may have an uncut portion projecting in the Z-axis direction relative to the position on the curved surface. The following error that occurs each time the direction of movement of the tool 52 in the Z-axis direction is reversed causes a machining defect in which the streak 61 extending in the X-axis direction is formed at the uppermost portion in the Z-axis direction.

The numerical controller 1 includes a correction function for correcting such a following error. A correction parameter being a control parameter for such a correction function is adjusted depending on characteristics such as the magnitude of friction in the operating mechanism 101. When the characteristics of the operating mechanism 101 change due to aging of the operating mechanism 101, the numerical controller 1 cannot correct the following error unless the correction parameter is adjusted in response to the change in the characteristics.

The maintenance support system 400 according to the first embodiment uses a simulation on the server 200 to study a state of operation when a machining defect due to a decrease in the operating accuracy of the operating mechanism 101 is found. On the basis of a result of the study, the server 200 generates proposal information for changing the control parameter, which is a parameter for controlling the operating mechanism 101, and sends the proposal information generated to the numerical controller 1. An operator who operates the machine tool 100 can check the proposal information sent from the server 200 on the numerical controller 1. The maintenance support system 400 thus supports the maintenance of the machine tool 100.

Next, the operation of the maintenance support system 400 for supporting the maintenance of the machine tool 100 will be described. When an operator of the machine tool 100 at the production site has found a machining defect, he/she inputs, to the input unit 4, a program number of a machining program for the workpiece 60 in which the machining defect has occurred. The numerical controller 1 may control to display an input screen for the program number on the display unit 5. An operation terminal for inputting the program number may be installed at the production site.

The program analysis unit 14 analyzes the command path described in the machining program that is specified by the input program number. The command path is a path for changing the command position. The program analysis unit 14 extracts a portion where the machining defect can occur from the command path. In the case of the command path illustrated in FIG. 8, the program analysis unit 14 extracts a portion including a reverse position, which is a position at which the direction of a change in the command position in the Z-axis direction is reversed, as well as a position before the reverse position and a position after the reverse position on the command path.

Next, the program analysis unit 14 determines the direction involved in the movement of the position among the axial directions in the vicinity of the portion extracted, and selects a target axis for which data for generating operation information is to be acquired. In the case of the command path illustrated in FIG. 8, the directions involved in the movement of the position in the vicinity of the reverse position are the Y-axis direction and the Z-axis direction, and there is no movement in the X-axis direction. In this case, the program analysis unit 14 selects the Y-axis and the Z-axis.

For the portion extracted by the program analysis unit 14, the operation information generating unit 15 causes the operating mechanism 101 to operate according to the machining program. For the axis selected by the program analysis unit 14, the operation information generating unit 15 acquires time series data for generating the operation information. The time series data is various position data in a time series at the time the operating mechanism 101 is operated, and includes data on the command position in a time range in which the operating mechanism 101 is operated, data on the response position in the time range, and data on the command torque in the time range. When the Y-axis and the Z-axis are selected, the operation information generating unit 15 acquires time series data including the command positions CPy and CPz, the response positions RPy and RPz, and the command torques CTy and CTz. The operation information generating unit 15 thus acquires the time series data being the data related to the state of operation when a decrease in the operating accuracy, which is an anomaly of the operating mechanism 101, is recognized. That is, when an anomaly is found in the operating mechanism 101, the operation information generating unit 15 acquires the time series data in the time range including the time when the anomaly is found from among the data related to the state of operation including the normal time of the operating mechanism 101.

The operation information generating unit 15 also reads, from the storage unit 6, the control parameter when the operating mechanism 101 is operated. Among the control parameters stored in the storage unit 6, the operation information generating unit 15 reads the control parameter that possibly affects a change in the position of the operating mechanism 101 such as the gain in the feedback control or the correction parameter for correcting the following error. The operation information generating unit 15 generates the operation information including the time series data acquired and the control parameter read. The communication unit 3 transmits the operation information generated by the operation information generating unit 15 to the server 200.

The numerical controller 1 may hold the time series data by storing the various position data at all times in the storage unit 6 during machining by the machine tool 100. When the time series data is held, the operation information generating unit 15 need not cause the operating mechanism 101 to operate according to the machining program. Among the time series data being held, the operation information generating unit 15 reads the time series data for the portion extracted by the program analysis unit 14. Instead of acquiring the time series data by the operation of the operating mechanism 101, the operation information generating unit 15 reads the times series data being held to be able to acquire the time series data related to the state of operation when a decrease in the operating accuracy is recognized. In this case, the operation information generating unit 15 does not require the operation of the operating mechanism 101 for acquiring the time series data, and thus can reduce the time required for generating the operation information.

The communication unit 21 of the server 200 receives the operation information transmitted by the communication unit 3 of the numerical controller 1. The simulation processing unit 24 simulates the state of operation of the operating mechanism 101 on the basis of the operation information received.

Figure 10:
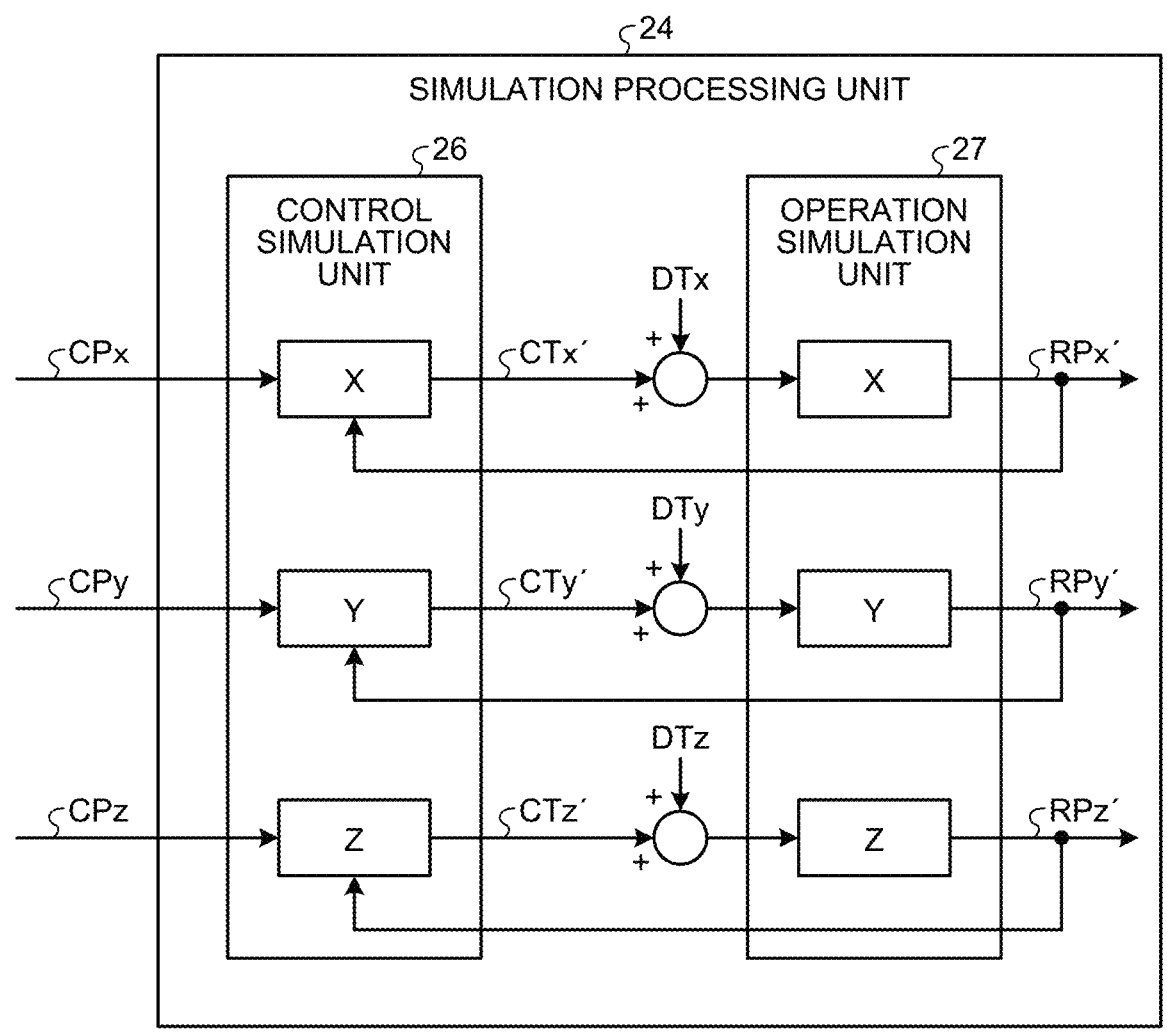
FIG. 10 is a diagram illustrating a functional configuration of a simulation processing unit included in the support processing unit illustrated in FIG. 1.

FIG. 10 is a diagram illustrating a functional configuration of the simulation processing unit 24 included in the support processing unit 23 illustrated in FIG. 1. The simulation processing unit 24 includes a control simulation unit 26 that simulates the control of the operating mechanism 101, and an operation simulation unit 27 that simulates the operation of the operating mechanism 101. Note that as in the above example, when the operation information includes the time series data for the Y-axis and the Z-axis and does not include the time series data for the X-axis, the simulation processing unit 24 runs a simulation of the operation and control for the Y-axis and the Z-axis, and does not run a simulation of the operation and control for the X-axis. The following description assumes that the simulation processing unit 24 runs a simulation of the operation and control for the X-axis, the Y-axis, and the Z-axis.

The control simulation unit 26 receives the data of the command positions CPx, CPy, and CPz for the respective axes among the time series data included in the operation information. The control simulation unit 26 runs a simulation of the control by the servo control unit 17 to obtain an estimated value CTx' of the command torque generated from the command position CPx, an estimated value CTy' of the command torque generated from the command position CPy, and an estimated value CTz' of the command torque generated from the command position CPz. The control simulation unit 26 outputs the estimated values CTx', CTy', and CTz' obtained.

A disturbance caused by the friction acting on the operating mechanism 101 is expressed as a disturbance torque about each axis. A disturbance torque DTx about the X-axis is added to the estimated value CTx'. A disturbance torque DTy about the Y-axis is added to the estimated value CTy'. A disturbance torque DTz about the Z-axis is added to the estimated value CTz'. The operation simulation unit 27 receives the estimated value CTx' to which the disturbance torque DTx is added, the estimated value CTy' to which the disturbance torque DTy is added, and the estimated value CTz' to which the disturbance torque DTz is added.

The operation simulation unit 27 obtains an estimated value PRx' of the response position by simulating the operation of the X servomotor 11 on the basis of the estimated value CTx' to which the disturbance torque DTx is added. The operation simulation unit 27 obtains an estimated value PRy' of the response position by simulating the operation of the Y servomotor 12 on the basis of the estimated value CTy' to which the disturbance torque DTy is added. The operation simulation unit 27 obtains an estimated value PRz' of the response position by simulating the operation of the Z servomotor 13 on the basis of the estimated value CTz' to which the disturbance torque DTz is added.

Note that the control simulation unit 26 performs feedback control of the estimated value CTx' by an operation for adjusting the estimated value CTx' such that the estimated value RPx' of the response position follows the command position CPx. The control simulation unit 26 performs feedback control of the estimated value CTy' by an operation for adjusting the estimated value CTy' such that the estimated value RPy' of the response position follows the command position CPy. The control simulation unit 26 performs feedback control of the estimated value CTz' by an operation for adjusting the estimated value CTz' such that the estimated value RPz' of the response position follows the command position CPz. The control simulation unit 26 reads the gain of the feedback control among the control parameters included in the operation information, and performs the feedback control using the gain that has been read.

As described above, the simulation processing unit 24 runs the simulation of the control of the operating mechanism 101 and the simulation of the operation of the operating mechanism 101, and obtains the estimated values RPx', RPy', and RPz' of the response position that are results of simulating the state of operation of the operating mechanism 101.

The simulation processing unit 24 needs a control model to simulate the control for each axis, an operation model to simulate the operation for each axis, and a disturbance torque model for each axis. The control simulation unit 26 includes a configuration that enables execution of the same processing as that of the servo control unit 17 for each axis in order to simulate the control for each axis. A configuration for simulating the operation for each axis in the operation simulation unit 27 and the disturbance torque model for the axes are determined by performing system identification using the response positions RPx, RPy, and RPz and the command torques CTx, CTy, and CTz that are included in the operation information. The system identification can be performed using a method such as identification using an autoregressive with exogenous input (ARX) model or a subspace identification method.

Note that when data used for the above system identification is insufficient, the model may not be identified correctly, which may result in a large difference between a path 65 based on the estimated values RPx', RPy', and RPz' obtained by the simulation in the simulation processing unit 24 and a path based om the response positions RPx, RPy, and RPz included in the operation information. In such a case, the server 200 may request the numerical controller 1 to add time series data on the basis of the result of simulation of the state of operation by the simulation processing unit 24.

For example, in response to the request from the server 200, the program analysis unit 14 of the numerical controller 1 re-extracts a portion of the command path by expanding the range of the portion extracted from the command path described in the machining program, that is, expanding the time range of the time series data extracted. The operation information generating unit 15 generates operation information by acquiring the time series data for the portion re-extracted. The communication unit 3 of the numerical controller 1 transmits the operation information generated to the server 200. The numerical controller 1 thus transmits, to the server 200, the operation information including the time series data in the expanded time range of the time series. The simulation processing unit 24 re-executes the simulation on the basis of the time series data in the expanded range. As a result, the simulation processing unit 24 can run an accurate simulation.

Figure 11:
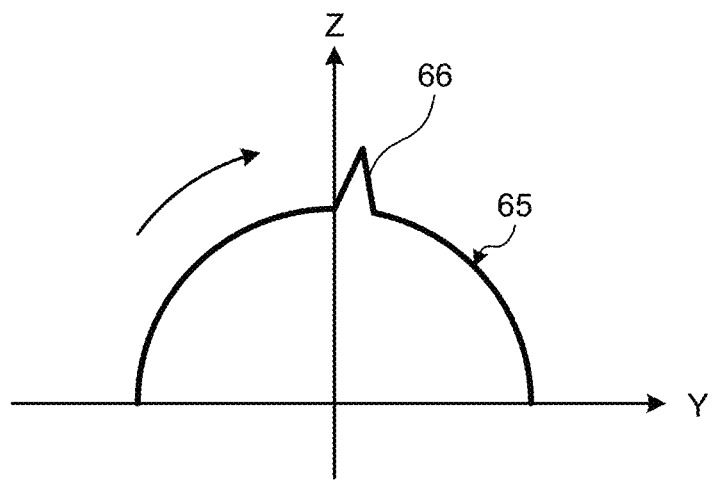
FIG. 11 is a diagram illustrating a first example of a result of a simulation by the simulation processing unit illustrated in FIG. 10.

FIG. 11 is a diagram illustrating a first example of a result of a simulation by the simulation processing unit 24 illustrated in FIG. 10. The path 65 illustrated in FIG. 11 illustrates a simulation result of the path of the tool 52 obtained by plotting the estimated values RPy' and RPz' of the response position when the workpiece 60 illustrated in FIG. 9 is machined. The path 65 corresponds to the arc in the YZ plane of the workpiece 60. The path 65 also includes a projection 66 caused by a following error of the estimated value CTz'. In FIG. 11, the projection 66 caused by such a following error is enlarged for illustration.

The projection 66 is caused by the following error immediately after the direction of movement of the path 65 in the Z-axis direction is reversed, that is, when the quadrant of the position on the path 65 is switched. The projection 66 is caused by a decrease in followability due to the effect of reversing the direction of friction, which is a disturbance, and the path 65 bulging outward to a side away from the origin of the Y-axis and Z-axis from the arc. Such an error in the path 65 is referred to as a quadrant projection. The projection 66 being the quadrant projection causes the streak 61 illustrated in FIG. 9.

When having found the quadrant projection on the basis of the result of the simulation, the simulation processing unit 24 changes the correction parameter, which is the control parameter for correcting the quadrant projection, in order to adjust a degree of correction of the quadrant projection for the simulation about the Z-axis run by the control simulation unit 26. Since the degree of correction of the quadrant projection is insufficient for the projection 66 illustrated in FIG. 11, the simulation processing unit 24 changes the correction parameter so as to increase the degree of correction.

Note that depending on the setting of the correction parameter or the state of the operating mechanism 101, the quadrant projection may occur such that the path 65 goes inward to a side closer to the origin of the Y-axis and the Z-axis relative to the arc. In this case, the degree of correction of the quadrant projection is excessive, so that the simulation processing unit 24 changes the correction parameter so as to decrease the degree of correction.

After changing the control parameter, the simulation processing unit 24 re-executes the simulation of the control and the operation of the operating mechanism 101. The simulation processing unit 24 determines whether or not the correction of the quadrant projection is appropriate each time the simulation is executed. The maintenance support system 400 can confirm the effect of changing the control parameter by such a simulation and thus can reduce the time required for the confirmation as compared to a case where actual machining is performed for confirming the effect.

Figure 12:
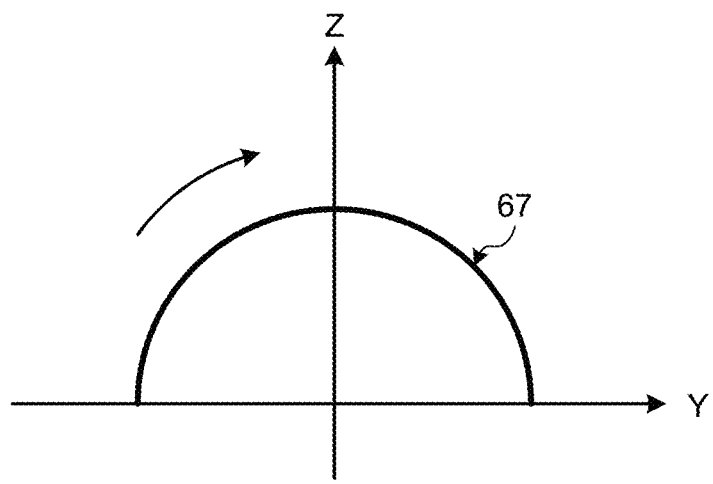
FIG. 12 is a diagram illustrating a second example of a result of a simulation by the simulation processing unit illustrated in FIG. 10.

FIG. 12 is a diagram illustrating a second example of a result of a simulation by the simulation processing unit 24 illustrated in FIG. 10. A path 67 illustrated in FIG. 12 illustrates a simulation result when the correction of the quadrant projection is determined to be appropriate. The simulation processing unit 24 outputs, to the proposal information generating unit 25, the control parameter when the correction of the quadrant projection is determined to be appropriate.

The proposal information generating unit 25 obtains a difference between the control parameter before the change included in the operation information and the control parameter after the change by the simulation processing unit 24. The proposal information generating unit 25 generates proposal information including a change plan for the control parameter on the basis of the difference obtained. The communication unit 21 transmits the proposal information generated by the proposal information generating unit 25 to the numerical controller 1.

The communication unit 3 of the numerical controller 1 receives the proposal information transmitted by the communication unit 21 of the server 200. The display unit 5 displays the change plan for the control parameter included in the proposal information. An operator of the machine tool 100 can change the control parameter according to the change plan displayed. The numerical controller 1 may also accept on the input unit 4 an operation for approving the change plan displayed. When the change plan is approved by the operation of the operator of the machine tool 100, the control unit 2 changes the control parameter according to the change plan. The operator of the machine tool 100, regardless of experience or level of skill, can appropriately adjust the control parameter by referring to the proposal information from the server 200. The maintenance vendor can provide the operator with the proposal information for the maintenance without having to go to the production site where the machine tool 100 is installed. In addition, the maintenance vendor can promptly respond to any machining defects in the machine tool 100.

Figure 13:
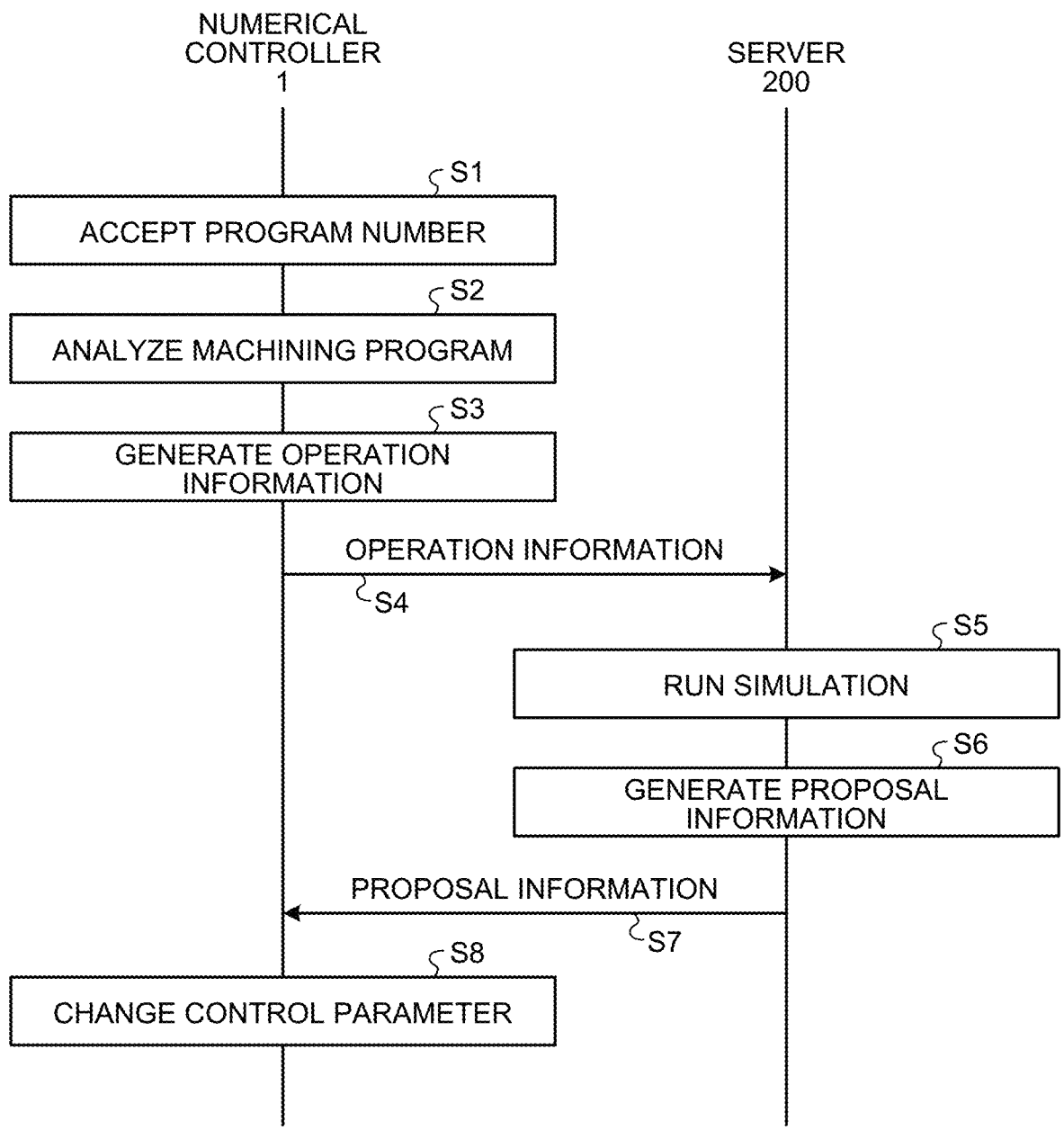
FIG. 13 is a chart for explaining a procedure related to a control method of the maintenance support system according to the first embodiment.

FIG. 13 is a chart for explaining a procedure related to a control method of the maintenance support system 400 according to the first embodiment. In step S1, the input unit 4 of the numerical controller 1 accepts a program number. In step S2, the program analysis unit 14 of the numerical controller 1 analyzes a machining program specified by the program number in step S1. In step S3, the operation information generating unit 15 of the numerical controller 1 generates operation information including time series data and control parameters on the basis of a result of the analysis in step S2. In step S4, the communication unit 3 of the numerical controller 1 transmits the operation information generated in step S3 to the server 200.

The communication unit 21 of the server 200 receives the operation information transmitted in step S4. In step S5, the simulation processing unit 24 of the server 200 runs a simulation of a state of operation of the operating mechanism 101 on the basis of the operation information received. In step S6, the proposal information generating unit 25 of the server 200 generates proposal information including a recipe for changing the control parameters on the basis of a result of the simulation in step S5. In step S7, the communication unit 21 transmits the proposal information generated in step S6 to the numerical controller 1.

The communication unit 3 of the numerical controller 1 receives the proposal information transmitted in step S7. The display unit 5 displays the proposal information received. In step S8, the control unit 2 of the numerical controller 1 changes the control parameters by an operation of the operator of the machine tool 100. The maintenance support system 400 then ends the operation according to the procedure illustrated in FIG. 13.

According to the first embodiment, the operation information generating unit 15 generates the operation information on the basis of the time series data related to the state of operation of the operating mechanism 101 when a machining defect is found. The support request processing unit 8 can appropriately select information necessary for troubleshooting by adjustment of the control parameters on the server 200, and send the information just enough to be utilized in the simulation on the server 200 to the server 200. The maintenance support system 400 can prevent transmission of excessive data from the numerical controller 1 to the server 200 and reduce the data traffic. The maintenance support system 400 can avoid a situation in which the necessary information is not sent due to narrowing down of the data sent from the numerical controller 1 to the server 200. The server 200 can accurately grasp the state of operation of the operating mechanism 101 by the operation information sent from the numerical controller 1. As a result, the maintenance support system 400 has the effect of being able to accurately grasp the state of operation by the operating mechanism 101 of the industrial machine and to reduce the data traffic.

Second Embodiment

The maintenance support system 400 according to a second embodiment monitors an index value of a state of operation of the operating mechanism 101 with the numerical controller 1, and detects a sign of malfunction when the index value exceeds a threshold. The maintenance support system 400 inspects log data of the index value when the index value exceeds the threshold on the server 200, and determines whether or not maintenance is required for the parts included in the operating mechanism 101. The server 200 generates proposal information regarding maintenance of the parts on the basis of a result of the determination as to whether or not maintenance is required, and sends the proposal information generated to the numerical controller 1. An operator who operates the machine tool 100 can check the proposal information sent from the server 200 on the numerical controller 1. The maintenance support system 400 thus supports the maintenance of the machine tool 100.

Figure 14:
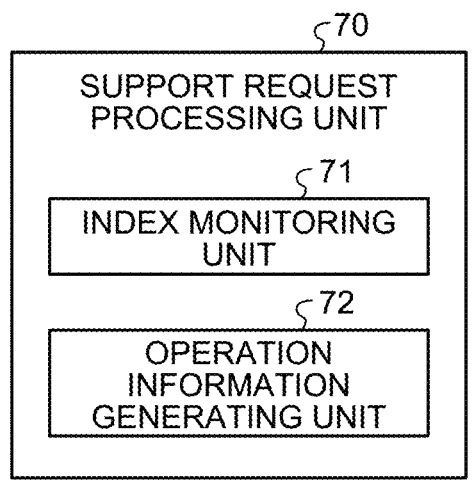
FIG. 14 is a diagram illustrating a functional configuration of a support request processing unit included in a numerical controller of a maintenance support system according to a second embodiment of the present invention.

FIG. 14 is a diagram illustrating a functional configuration of a support request processing unit 70 included in the numerical controller 1 of the maintenance support system 400 according to the second embodiment of the present invention. In the second embodiment, the support request processing unit 70 is provided in the numerical controller 1 in place of the support request processing unit 8 illustrated in FIG. 2. The support request processing unit 70 performs processing of requesting support for the maintenance of the machine tool 100.

The support request processing unit 70 includes an index monitoring unit 71 that monitors the index value for the state of operation of the operating mechanism 101. The support request processing unit 70 further includes an operation information generating unit 72 that generates operation information, which is transmitted to the server 200 to request support for the maintenance, on the basis of data related to the state of operation when a decrease in the operating accuracy of the operating mechanism is recognized.

Figure 15:
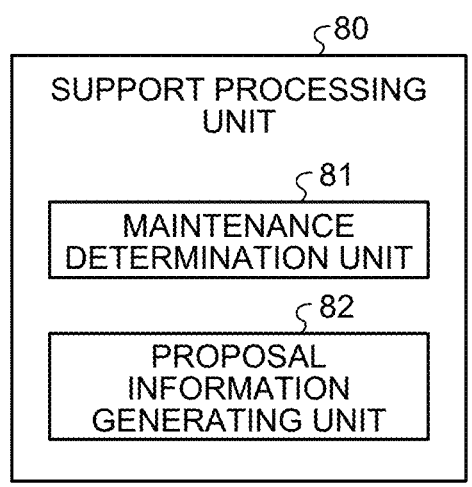
FIG. 15 is a diagram illustrating a functional configuration of a support processing unit included in a server of the maintenance support system according to the second embodiment.

FIG. 15 is a diagram illustrating a functional configuration of a support processing unit 80 included in the server 200 of the maintenance support system 400 according to the second embodiment. In the second embodiment, the support processing unit 80 is provided in the server 200 in place of the support processing unit 23 illustrated in FIG. 3. The support processing unit 80 performs processing for supporting the maintenance of the machine tool 100.

Components of the operating mechanism 101 include parts such as a ball screw and a bearing that make up a feed drive system or spindle. The ball screw and the bearing have a rolling element that rotates while receiving a load. The rolling element can be worn or scratched by long-term use. Due to wear or scratches, the rolling element can cause a phenomenon being a sign of malfunction such as an increase in load on a feed shaft or resonance at a specific frequency component. When the ball screw and the bearing continue to be used with such a phenomenon occurring, a disturbance due to the friction acting on the components of the operating mechanism 101 increases, causing malfunction such as enlargement of a quadrant projection. The operating mechanism 101 becomes inoperable when the ball screw or bearing is completely damaged, and the machine tool 100 can no longer perform machining. The longer the period until the damaged part is replaced, the longer the period for which the operation of the machine tool 100 is stopped, and the greater the hindrance to production.

The maintenance support system 400 detects a sign of damage to the part on the basis of the log data of the index value. By allowing the part to be replaced before the part is completely damaged, the machine tool 100 can avoid a situation where the operation is stopped and can minimize a decrease in productivity.

The index monitoring unit 71 monitors the load of the axes and the height of a resonance peak as the index values. The load of the axes is obtained by a root mean square of the command torques of the X servomotor 11, the Y servomotor 12, the Z servomotor 13, and the spindle motor. The height of the resonance peak is obtained by a fast Fourier transform (FFT) analysis on the command torques of the X servomotor 11, the Y servomotor 12, and the Z servomotor 13. A ring buffer, which is an area for storing the log data of the index values, is secured in the storage unit 6. When the amount of log data stored in the ring buffer reaches an upper limit of the amount of data that can be stored in the ring buffer, the oldest data in the ring buffer is rewritten to the latest data.

When the index monitoring unit 71 has detected a load exceeding a preset threshold, the operation information generating unit 72 reads load data, which is history data of the load, among the log data held in the ring buffer. The operation information generating unit 72 generates operation information including the load data that has been read. When the index monitoring unit 71 has detected a height of the resonance peak exceeding a preset threshold, the operation information generating unit 72 generates operation information including a result of an FFT analysis at that time. The communication unit 3 transmits the operation information generated by the operation information generating unit 72 to the server 200.

The communication unit 21 of the server 200 receives the operation information transmitted by the communication unit 3 of the numerical controller 1. A maintenance determination unit 81 determines whether or not maintenance of the part is required on the basis of the load data or the result of the FFT analysis included in the operation information. For the part such as the ball screw or bearing, the storage unit 22 holds first profile information indicating a change in the load that is a sign of damage to the part, and second profile information indicating a change in the height of the resonance peak that is a sign of damage to the part. The maintenance determination unit 81 determines that maintenance of the part is required when the change in the load data matches the first profile information. Similarly, the maintenance determination unit 81 determines that maintenance of the part is required when the change in the height of the resonance peak matches the second profile information. The maintenance determination unit 81 determines that maintenance of the part is not required when the change in the load data does not match the first profile information and when the change in the height of the resonance peak does not match the second profile information.

When the maintenance determination unit 81 determines that maintenance of the part is required, a proposal information generating unit 82 generates proposal information for prompting the replacement of the part. When the maintenance determination unit 81 determines that maintenance of the part is not required, the proposal information generating unit 82 generates proposal information indicating that the replacement of the part is not required. The communication unit 21 transmits the proposal information generated by the proposal information generating unit 82 to the numerical controller 1.

The communication unit 3 of the numerical controller 1 receives the proposal information transmitted by the communication unit 21 of the server 200. The display unit 5 displays the proposal information received. When the proposal information prompting the replacement of the part is displayed, an operator of the machine tool 100 replaces the part or requests the maintenance vendor to replace the part. The machine tool 100, regardless of experience or level of skill of the operator, can prevent damage to the part by referring to the proposal information from the server 200. The operator can prepare in advance a part for replacement or materials related to part replacement before the part is damaged. The maintenance vendor can efficiently operate the maintenance service by providing in advance the part for replacement or the materials related to part replacement to the production site.

FIG. 16 is a chart for explaining a control method of the maintenance support system 400 according to the second embodiment. In step S11, the index monitoring unit 71 of the numerical controller 1 monitors index values. If the index value exceeding a threshold is detected in the monitoring of step S11, the operation information generating unit 72 of the numerical controller 1 generates operation information including log data of the index value in step S12. In step S13, the communication unit 3 of the numerical controller 1 transmits the operation information generated in step S12 to the server 200.

The communication unit 21 of the server 200 receives the operation information transmitted in step S13. In step S14, the maintenance determination unit 81 of the server 200 determines whether or not maintenance of the part is required on the basis of the operation information received. In step S15, the operation information generating unit 15 generates proposal information indicating a result of the determination in step S14. In step S16, the communication unit 21 transmits the proposal information generated in step S15 to the numerical controller 1.

The communication unit 3 of the numerical controller 1 receives the proposal information transmitted in step S16. In step S17, the display unit 5 displays the proposal information received. The maintenance support system 400 then ends the operation according to the procedure illustrated in FIG. 16.

According to the second embodiment, the maintenance support system 400 can provide support for preventing damage to the part by presenting the proposal information prompting the maintenance of the part to the operator of the machine tool 100 at the time when the sign of damage to the part is present. The operation information generating unit 72 generates the operation information including the log data of the index value when the index value exceeds the threshold. Since the operation information including the log data of the index value is generated when the index value exceeds the threshold, data on the index value not exceeding the threshold is not transmitted. The support request processing unit 70 can appropriately select the information necessary for determining whether or not the maintenance is required, and send the information just enough to be utilized in the determination to the server 200. The maintenance support system 400 can prevent transmission of excessive data from the numerical controller 1 to the server 200 and reduce the data traffic. The maintenance support system 400 can avoid a situation in which the necessary information is not sent due to narrowing down of the data sent from the numerical controller 1 to the server 200. The server 200 can accurately grasp the state of operation of the operating mechanism 101 by the operation information sent from the numerical controller 1. As a result, the maintenance support system 400 has the effect of being able to accurately grasp the state of operation by the operating mechanism 101 of the industrial machine and to reduce the data traffic.

The configuration illustrated in the above embodiment merely illustrates an example of the content of the present invention, and can thus be combined with another known technique or partially omitted and/or modified without departing from the scope of the present invention.

REFERENCE SIGNS LIST 1 numerical controller; 2, 20 control unit; 3, 21 communication unit; 4 input unit; 5 display unit; 6, 22 storage unit;

7 drive control unit; 8, 70 support request processing unit; 11 X servomotor; 12 Y servomotor; 13 Z servomotor; 14 program analysis unit; 15, 72 operation information generating unit; 16 command value generating unit; 17 servo control unit; 23, 80 support processing unit; 24 simulation processing unit; 25, 82 proposal information generating unit; 26 control simulation unit; 27 operation simulation unit; 31, 41 CPU; 32, 42 RAM; 33, 43 ROM; 34, 44 external storage device; 35, 45 communication I/F; 36 input device; 37 display; 38, 46 bus; 50 column; 51 spindle head; 52 tool; 53 stage; 54, 55, 60 workpiece; 61 streak; 65, 67 path; 66 projection; 71 index monitoring unit; 81 maintenance determination unit; 100 machine tool; 101 operating mechanism; 200 server; 300 network; 400 maintenance support system.

The invention claimed is:

1. A maintenance support system comprising a numerical controller to control drive of an operating mechanism of an industrial machine and a support device to be able to communicate with the numerical controller, the maintenance support system supporting maintenance of the industrial machine, wherein
the numerical controller comprises a first information generating circuitry to extract data related to an operation anomaly from among data related to a state of operation of the operating mechanism when the operation anomaly is found in the operating mechanism, and to generate first information including the data extracted, and
the support device comprises
a second information generating circuitry to generate second information to be proposed to the numerical controller for the maintenance on a basis of content of the first information,
the operating mechanism is a mechanism that causes an object of movement to move in a direction of each of a plurality of axes, and
the first information generating circuitry extracts the data related to the operation anomaly for a portion extracted from a command path and for a direction selected on the basis of a direction of movement corresponding to the portion extracted among the directions of the plurality of axes, the command path being a path along which a command position as a target of movement changes.

2. The maintenance support system according to claim 1, wherein the first information generating circuitry acquires time series data in a time range including a time when the operation anomaly is found, and generates the first information including the time series data.

3. The maintenance support system according to claim 2, wherein
the support device requests the numerical controller to add the time series data, and
the numerical controller transmits the first information including the time series data in an expanded time range to the support device in response to the request from the support device.

4. The maintenance support system according to claim 1, wherein
the support device comprises
a simulation processing circuitry to simulate a state of operation of the operating mechanism by a simulation of control of the operating mechanism based on the content of the first information and a simulation of operation of the operating mechanism based on the content of the first information, and
the second information generating circuitry generates the second information on the basis of a result of the simulation by the simulation processing circuitry.

5. The maintenance support system according to claim 1, wherein the second information generating circuitry generates the second information including a proposal for changing a control parameter that is a parameter for controlling the operating mechanism.

6. The maintenance support system according to claim 1, wherein
the numerical controller comprises
an index monitor to monitor an index value for the state of operation of the operating mechanism, and
the first information generating circuitry generates the first information including the index value when the operation anomaly with the index value exceeding a threshold is found.

7. The maintenance support system according to claim 6, wherein the support device comprises
a maintenance determination circuitry to determine whether or not maintenance of a part included in the operating mechanism is required on the basis of the content of the first information, and
the second information generating circuitry generates the second information indicating a result of the determination as to whether or not the maintenance is required.

8. A numerical controller for controlling drive of an operating mechanism of an industrial machine, the numerical controller comprising:
a first information generating circuitry to extract data related to an operation anomaly from among data related to a state of operation of the operating mechanism when the operation anomaly is found in the operating mechanism, and to generate first information including the data extracted; and
a transceiver to be able to communicate with a support device that generates second information to be proposed to the numerical controller for maintenance of the industrial machine,
the operating mechanism is a mechanism that causes an object of movement to move in a direction of each of a plurality of axes, and
the first information generating circuitry extracts the data related to the operation anomaly for a portion extracted from a command path d for a direction selected on the basis of a direction of movement corresponding to the portion extracted among the directions of the plurality of axes, the command path being a path along which a command position as a target of movement changes.

9. The numerical controller according to claim 8, wherein the first information generating circuitry acquires time series data in a time range including a time when the operation anomaly is found, and generates the first information including the time series data.

10. A control method of a maintenance support system comprising a numerical controller to control drive of an operating mechanism of an industrial machine and a support device to be able to communicate with the numerical controller, the maintenance support system supporting maintenance of the industrial machine, and the control method comprising:
extracting data related to an operation anomaly from among data related to a state of operation of the operating mechanism when the operation anomaly is found in the operating mechanism, and generating first information including the data extracted; and generating second information to be proposed to the numerical controller for the maintenance on the basis of content of the first information, wherein the operating mechanism is a mechanism that causes an object of movement to move in a direction of each of a plurality of axes, and in generating the first information, the data related to the operation anomaly is extracted for a portion extracted from a command path and for a direction selected on a basis of a direction of movement corresponding to the portion extracted among the directions of the plurality of axes, the command path being a path along which a command position as a target of movement changes.

11. A maintenance support system comprising a numerical controller to control drive of an operating mechanism of an industrial machine and a support device to be able to communicate with the numerical controller, the maintenance support system supporting maintenance of the industrial machine, wherein the numerical controller comprises a first information generating circuitry to extract data related to an operation anomaly from among data related to a state of operation of the operating mechanism when the operation anomaly is found in the operating mechanism, and to generate first information including the data extracted, the support device comprises a second information generating circuitry to generate second information to be proposed to the numerical controller for the maintenance on a basis of content of the first information, the operating mechanism is a mechanism that causes an object of movement to move by converting rotary motion of a motor into linear motion, and the first information generating circuitry extracts data of a command position that represents a position as a target of movement, data of command torque for controlling torque to be generated in the motor, and data of a response position that is a position reached by the object of movement through control of the motor according to the command torque.

12. The maintenance support system according to claim 11, wherein the first information generating circuitry acquires time series data in a time range including a time when the operation anomaly is found, and generates the first information including the time series data.

13. The maintenance support system according to claim 12, wherein the support device requests the numerical controller to add the time series data, and the numerical controller transmits the first information including the time series data in an expanded time range to the support device in response to the request from the support device.

14. The maintenance support system according to claim 11, wherein the support device comprises a simulation processing circuitry to simulate a state of operation of the operating mechanism by a simulation of control of the operating mechanism based on the content of the first information and a simulation of operation of the operating mechanism based on the content of the first information, and the second information generating circuitry generates the second information on the basis of a result of the simulation by the simulation processing circuitry.

15. The maintenance support system according to claim 11, wherein the second information generating circuitry generates the second information including a proposal for changing a control parameter that is a parameter for controlling the operating mechanism.

16. The maintenance support system according to claim 11, wherein the numerical controller comprises an index monitor to monitor an index value for the state of operation of the operating mechanism, and the first information generating circuitry generates the first information including the index value when the operation anomaly with the index value exceeding a threshold is found.

17. The maintenance support system according to claim 16, wherein the support device comprises a maintenance determination circuitry to determine whether or not maintenance of a part included in the operating mechanism is required on the basis of the content of the first information, and the second information generating circuitry generates the second information indicating a result of the determination as to whether or not the maintenance is required.

* * * * *